United States Patent
Chida (10) Patent No.: US 11,874,294 B2
(45) Date of Patent: Jan. 16, 2024

(54) ACCELERATION DETECTION DEVICE

(71) Applicant: Murata Manufacturing Co., Ltd., Nagaokakyo (JP)

(72) Inventor: Shingo Chida, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/974,582

(22) Filed: Oct. 27, 2022

(65) Prior Publication Data

US 2023/0046600 A1 Feb. 16, 2023

Related U.S. Application Data

(63) Continuation of application No. PCT/JP2021/013003, filed on Mar. 26, 2021.

(30) Foreign Application Priority Data

May 12, 2020 (JP) ................................. 2020-083793

(51) Int. Cl.
*G01P 15/09* (2006.01)
*G01P 1/02* (2006.01)

(52) U.S. Cl.
CPC ............... *G01P 15/09* (2013.01); *G01P 1/02* (2013.01); *G01P 1/023* (2013.01); *G01P 15/0922* (2013.01)

(58) Field of Classification Search
CPC .. G01P 1/023; G01P 1/02; G01P 15/09; G01P 15/0922
See application file for complete search history.

(56) References Cited

U.S. PATENT DOCUMENTS 5,003,824 A * 4/1991 Fukada ............... G01P 15/0922
310/331
5,633,461 A * 5/1997 Kakizaki ................. G01P 1/023
73/431

(Continued)

FOREIGN PATENT DOCUMENTS

JP H07128357 A 5/1995
JP 2011075442 A 4/2011

(Continued)

OTHER PUBLICATIONS

English Translation of JP2013-195103.*

(Continued)

*Primary Examiner* — Helen C Kwok
(74) *Attorney, Agent, or Firm* — Keating & Bennett, LLP (57) ABSTRACT

An acceleration detection device includes a board including first and second surfaces, an acceleration detector on the first surface of the board, first circuit components on the second surface of the board, a seal including a first sealing portion covering the acceleration detector on the first surface of the board and a second sealing portion covering the first circuit components on the second surface of the board, the second sealing portion including an inner surface facing the board and an outer surface on a side opposite to the inner surface, the seal being made of a resin, and a high-rigidity body extending in a direction in which the outer surface and the second surface of the board are connected to each other within the second sealing portion, the high-rigidity body having higher rigidity than the seal.

20 Claims, 7 Drawing Sheets

(56) References Cited

U.S. PATENT DOCUMENTS

| | | | |
|---|---|---|---|
| 5,644,081 A | 7/1997 | Schwarz et al. | |
| 5,679,897 A * | 10/1997 | Matsumoto | G01P 15/0922 |
| | | | 73/514.34 |
| 6,094,984 A * | 8/2000 | Asano | G01P 15/0915 |
| | | | 73/514.16 |
| 7,181,968 B2 * | 2/2007 | Still | G01P 1/023 |
| | | | 361/755 |
| 2002/0078749 A1 * | 6/2002 | Tajika | G01P 15/0922 |
| | | | 73/514.34 |
| 2011/0077820 A1 | 3/2011 | Tokui et al. | |
| 2013/0319113 A1 * | 12/2013 | Mizuta | G01P 1/003 |
| | | | 73/493 |
| 2015/0040666 A1 * | 2/2015 | Saito | G01P 1/023 |
| | | | 73/514.01 |
| 2016/0300781 A1 | 10/2016 | Xue et al. | |
| 2016/0327392 A1 | 11/2016 | Kim et al. | |
| 2017/0059605 A1 * | 3/2017 | Saito | G01C 19/5783 |
| 2017/0191832 A1 * | 7/2017 | Kinoshita | G01P 15/125 |

FOREIGN PATENT DOCUMENTS

| | | | |
|---|---|---|---|
| JP | 2013-195103 | * | 9/2013 |
| JP | 2013195103 A | | 9/2013 |
| JP | 2016201538 A | | 12/2016 |
| JP | 2017049122 A | | 3/2017 |

OTHER PUBLICATIONS

International Search Report in PCT/JP2021/013003, dated Jun. 15, 2021, 3 pages.

Written Opinion in PCT/JP2021/013003, dated Jun. 15, 2021, 3 pages.

* cited by examiner

ACCELERATION DETECTION DEVICE

CROSS REFERENCE TO RELATED APPLICATIONS

This application claims the benefit of priority to Japanese Patent Application No. 2020-083793 filed on May 12, 2020 and is a Continuation Application of PCT Application No. PCT/JP2021/013003 filed on Mar. 26, 2021. The entire contents of each application are hereby incorporated herein by reference.

BACKGROUND OF THE INVENTION

1. Field of the Invention

The present invention relates to an acceleration detection device for detecting vibrations of an object.

2. Description of the Related Art

Various acceleration detection devices having an acceleration detection element are conventionally known. For example, Japanese Unexamined Patent Application Publication No. 2011-75442 discloses an acceleration detection device that detects the acceleration of a vehicle. In the acceleration detection device described in Japanese Unexamined Patent Application Publication No. 2011-75442, an acceleration detection element and circuit components are mounted on one surface of a board. The other surface of the board is fixed to a detection object.

On the other hand, an acceleration detection device described in Japanese Unexamined Patent Application Publication No. 2013-195103 is provided with a first shock absorbing portion having an outer wall in contact with an object. A second shock absorbing portion that is softer than the first shock absorbing portion is provided inside the outer wall of the first shock absorbing portion. An acceleration detection element is held within the second shock absorbing portion. In addition, a thin-walled fixing member that fixes the first shock absorbing portion to the measurement object is provided.

In the acceleration detection device described in Japanese Unexamined Patent Application Publication No. 2011-75442, the board is fixed to a housing to be fixed to the vehicle. Therefore, circuit components and the like cannot be mounted on the surface of the board that faces the housing. Accordingly, the size cannot be easily reduced.

In the acceleration detection device described in Japanese Unexamined Patent Application Publication No. 2013-195103, the acceleration detection element and circuit components are mounted on one surface and the other surface of the board. However, since the resonant frequency during transmission of an acceleration from the measurement object is low in the acceleration detection device described in Japanese Unexamined Patent Application Publication No. 2013-195103, there is a problem in that a high-frequency acceleration cannot be easily detected.

SUMMARY OF THE INVENTION

Preferred embodiments of the present invention provide acceleration detection devices that are each able to be reduced in size and detect a high-frequency acceleration.

An acceleration detection device according to a preferred embodiment of the present invention includes a board including a first surface and a second surface facing away from the first surface, an acceleration detector mounted on the first surface of the board, a first circuit component mounted on the second surface of the board, a seal including a first sealing portion covering the acceleration detection element on the first surface of the board and a second sealing portion covering the first circuit component on the second surface of the board, the second sealing portion including an inner surface facing the board and an outer surface on a side opposite to the inner surface, the seal being made of a resin, and a high-rigidity body extending in a direction in which the outer surface and the second surface of the board are connected to each other within the second sealing portion, the high-rigidity body having higher rigidity than the seal.

According to preferred embodiments of the present invention, it is possible to provide acceleration detection devices that are each able to be reduced in size and detect a high-frequency acceleration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will be described below by describing preferred embodiments of the present invention with reference to the drawings.

The preferred embodiments described herein are exemplary and partial replacement or combination of structures is possible between different preferred embodiments.

Figure 1:
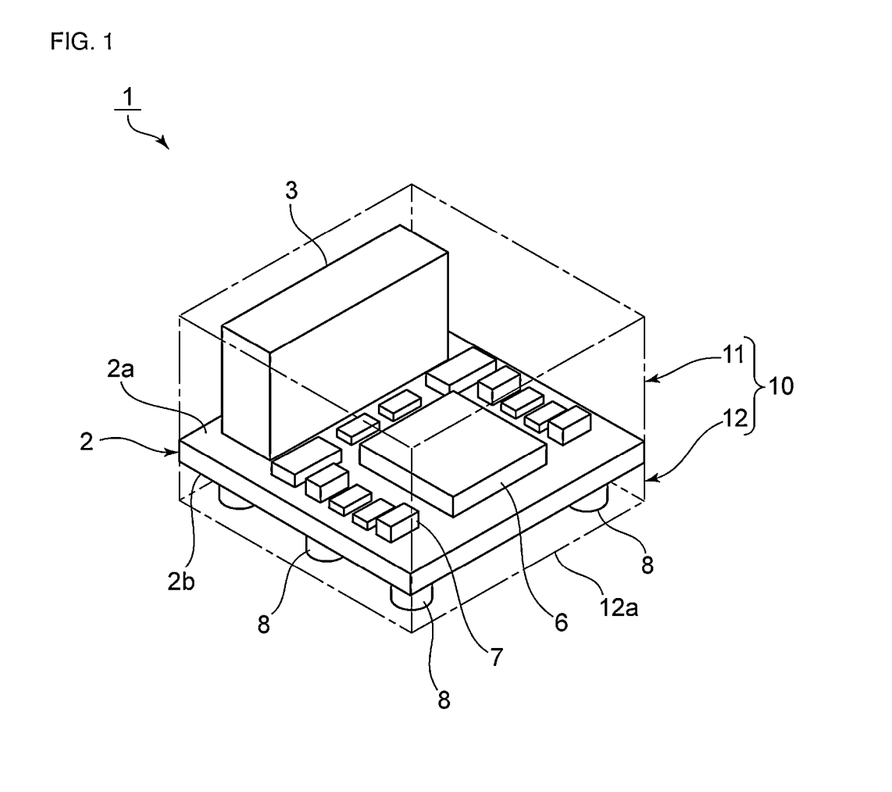
FIG. 1 is a perspective view schematically illustrating an acceleration detection device according to a first preferred embodiment of the present invention.
Figure 2:
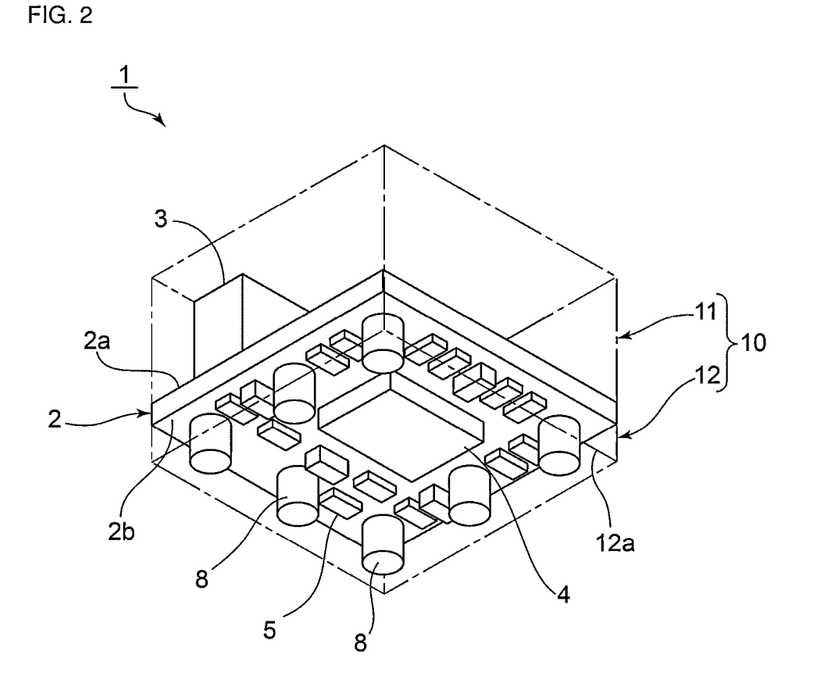
FIG. 2 is a perspective view schematically illustrating the acceleration detection device according to the first preferred embodiment of the present invention, as seen from a second surface of a board.
Figure 3:
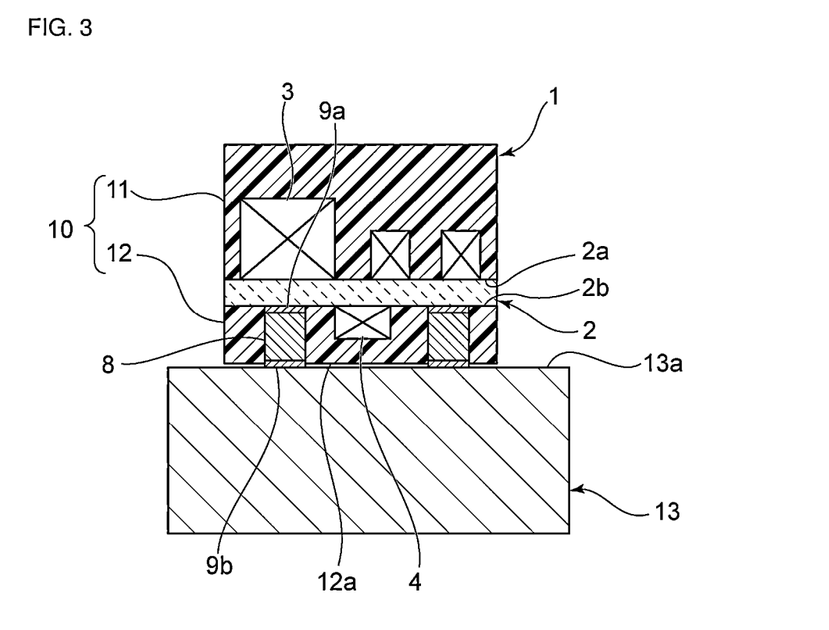
FIG. 3 is a front sectional view illustrating the acceleration detection device according to the first preferred embodiment of the present invention.

FIG. 1 is a perspective view schematically illustrating an acceleration detection device according to a first preferred embodiment of the present invention. FIG. 2 is a perspective view schematically illustrating the acceleration detection device according to the first preferred embodiment of the present invention, as seen from a second surface of a board. FIG. 3 is a front sectional view illustrating the acceleration detection device according to the first preferred embodiment of the present invention.

An acceleration detection device 1 according to the first preferred embodiment of the present invention includes a board 2. The planar shape of the board 2 is not particularly limited, but has, for example, a rectangular or substantially rectangular plate shape in the present preferred embodiment. The board 2 includes a first surface 2a and a second surface 2b that face away from each other. The board 2 is made of an insulating material such as, for example, glass epoxy or alumina. In addition, although not illustrated in FIG. 1, wiring for electrical connection and the like are provided on the first surface 2a and the second surface 2b of the board 2.

The acceleration detection device 1 according to the first preferred embodiment of the present invention includes an acceleration detection element 3, first circuit components 4 and second circuit components 6 and 7, and a plurality of high-rigidity members 8. The acceleration detection element 3 is mounted on the first surface 2a of the board 2. The acceleration detection element 3 detects the acceleration applied to the acceleration detection device 1. The acceleration detection element 3 outputs an electric signal corresponding to the magnitude of the applied acceleration.

The first circuit components 4 and 5 are mounted on the second surface 2b of the board 2. The second circuit components 6 and 7 are mounted on the first surface 2a of the board 2. The first circuit components 4 and 5 and the second circuit components 6 and 7 are electrically connected to each other and define an electronic circuit that drives the acceleration detection element 3 and outputs a signal from the acceleration detection element 3.

A first feature of the acceleration detection device 1 is that the first circuit components 4 and 5 are mounted on the second surface 2b of the board 2, and the second circuit components 6 and 7 are mounted on the first surface 2a of the board 2. In addition, the acceleration detection element 3 is mounted on the first surface 2a of the board 2. Accordingly, the size of the acceleration detection device 1 can be reduced.

The acceleration detection device 1 includes a sealing member 10 made of, for example, a resin. The sealing member 10 includes a first sealing portion 11 provided on the first surface 2a of the board 2 and a second sealing portion 12 provided on the second surface 2b of the board 2. The first sealing portion 11 covers the acceleration detection element 3 and the second circuit components 6 and 7 on the first surface 2a of the board 2. The second sealing portion 12 covers the first circuit components 4 and 5 on the second surface 2b of the board 2. The sealing member 10 seals the acceleration detection element 3, the first circuit components 4 and 5, and the second circuit components 6 and 7 within the acceleration detection device 1.

The first sealing portion 11 and the second sealing portion 12 are preferably made of, for example, a single resin. This facilitates manufacturing. However, the first sealing portion 11 and the second sealing portion 12 may be made of different resins. In addition, the first sealing portion 11 and the second sealing portion 12 may be connected and integrated with each other via the side surfaces of the board 2. That is, the board 2 may be embedded in the sealing member 10.

A second feature of the acceleration detection device 1 is that a plurality of high-rigidity members 8 are provided on the second surface 2b of the board 2. Each of the high-rigidity members 8 is made of a material having a rigidity relatively higher than that of the sealing member 10. Such a material is not particularly limited and, for example, metal, ceramic, or the like can be used.

The high-rigidity member 8 is defined by a cylindrical or substantially cylindrical metal pin in the present preferred embodiment. The shape of the high-rigidity member 8 is not limited to a cylindrical or substantially cylindrical shape and may have, for example, a prismatic or substantially prismatic shape. That is, a columnar body having any shape with a longitudinal direction may be used as the high-rigidity member 8.

As illustrated in FIG. 3, the acceleration detection device 1 is fixed to a detection object 13 via the second sealing portion 12. Here, it is assumed that the surface on the side opposite to the inner surface of the second sealing portion 12 that faces the board 2 is the outer surface 12a. The outer surface 12a is the mounting surface attached to the detection object 13. The high-rigidity members 8 extend in the direction in which the second surface 2b of the board 2 and the outer surface 12a are connected to each other. The direction in which the second surface 2b of the board 2 and the outer surface 12a are connected to each other is the longitudinal direction of the high-rigidity members 8.

In the present preferred embodiment, the high-rigidity members 8 are fixed and electrically connected to the second surface 2b of the board 2 by being joined to the second surface 2b of the board 2 via a conductive joint material 9a. The electrically conductive joint material 9a is electrically connected to the wiring, the acceleration detection element 3, the first circuit components 4 and 5, and the second circuit components 6 and 7 that are provided on the board 2.

An appropriate electrically conductive joint material such as, for example, solder or a conductive adhesive can be used as the electrically conductive joint material 9a. The electrically conductive joint material 9a may be base electrodes that define the high-rigidity members 8.

The high-rigidity members 8 are exposed externally from the outer surface 12a. There may be no steps between the outer surface 12a and the end portions of the high-rigidity members 8. In this case, the high-rigidity members 8 lead to the outer surface 12a. In addition, since the end portions of the high-rigidity members 8 are slightly recessed from the outer surface 12a as illustrated in FIG. 3, steps may be present between the outer surface 12a and the end portions of the high-rigidity members 8.

In the present preferred embodiment, the outer surface 12a is joined to a mount surface 13a of the detection object 13 via a joint material 9b. This fixes the acceleration detection device 1 to the detection object 13.

The joint material 9b may be a conductive joint material or an electrically non-conductive joint material.

The acceleration detection device 1 is provided with the plurality of high-rigidity members 8 as described above. The rigidity of the high-rigidity members 8 is higher than that of the sealing member 10. Accordingly, the frequency of the structural resonance of the entire acceleration detection device 1 is higher. Therefore, a higher-frequency acceleration can be detected compared with the case in which the high-rigidity members 8 are not present.

The detection object 13 is not particularly limited. For example, the acceleration detection device according to a preferred embodiment of the present invention can be installed in various detection objects such as a machine tool and a vehicle. The acceleration detection device 1 may be fixed to the detection object 13 via a relay board made of an insulating material such as, for example, glass epoxy or alumina.

As described above, the first feature enables the acceleration detection device 1 to be reduced in size, and the second feature enables a high-frequency acceleration to be detected.

Although the acceleration detection device 1 includes the plurality of high-rigidity members 8, at least one high-rigidity member is to be provided. The plurality of high-rigidity members 8 are preferably provided in a region in which the acceleration detection element 3 overlaps the board 2 as seen in the direction in which the outer surface 12a and the second surface 2b of the board 2 are connected to each other. Such a structure can detect a higher-frequency acceleration.

In addition, an insulating joint material may be used instead of the electrically conductive joint material 9a.

Furthermore, the high-rigidity member 8 is not limited to a member made of a conductive material such as, for example, a metal pin and may be a member made of an insulating material such as, for example, a ceramic.

However, preferably, as in the present preferred embodiment, the high-rigidity member 8 is electrically conductive and the high-rigidity member 8 is electrically connected to the wiring provided on the board 2, the acceleration detection element 3, the first circuit components 4 and 5, and the second circuit components 6 and 7.

Figure 4:
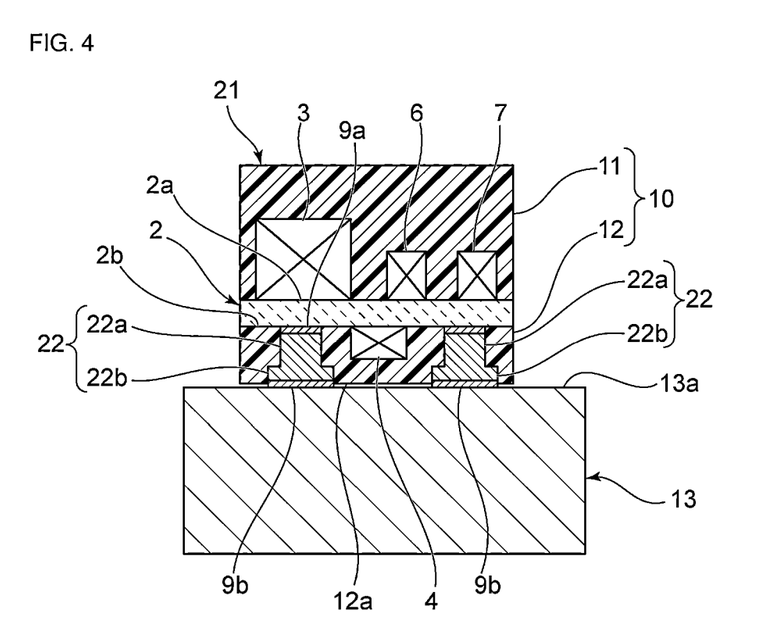
FIG. 4 is a front sectional view illustrating an acceleration detection device according to a second preferred embodiment of the present invention.

FIG. 4 is a front sectional view illustrating an acceleration detection device according to a second preferred embodiment of the present invention. An acceleration detection device 21 according to the second preferred embodiment of the present invention is the same or substantially the same as the acceleration detection device 1 according to the first preferred embodiment with the exception of the shape of the high-rigidity members. Accordingly, the same or corresponding components as in the acceleration detection device 1 are denoted by the same reference numerals, and description thereof is omitted.

In the acceleration detection device 21, a plurality of high-rigidity members 22 are provided on the second surface 2b of the board 2. The high-rigidity members 22 extend in the direction in which the second surface 2b of the board 2 and the outer surface 12a are connected to each other. The direction in which the second surface 2b of the board 2 and the outer surface 12a are connected to each other is the longitudinal direction of the high-rigidity member 22. The high-rigidity member 22 includes a small area portion 22a having a relatively small cross-sectional area in the direction orthogonal or substantially orthogonal to the longitudinal direction and a large area portion 22b having a relatively large cross-sectional area in the direction orthogonal or substantially orthogonal to the longitudinal direction. The small area portion 22a is joined to the second surface 2b of the board 2 via the electrically conductive joint material 9a. The large area portion 22b is joined to the mount surface 13a of the detection object 13 via the joint material 9b. The acceleration detection device 21 is fixed to the detection object 13 having a larger area via the large area portion 22b. Accordingly, in the acceleration detection device 21, the area of the junction portion between the high-rigidity member 22 and the mount surface 13a can be increased without the area of the outer surface 12a of the board 2 being increased. Therefore, the frequency of the structural resonance of the entire acceleration detection device 21 can be higher without the area of the board 2 being increased.

Figure 5:
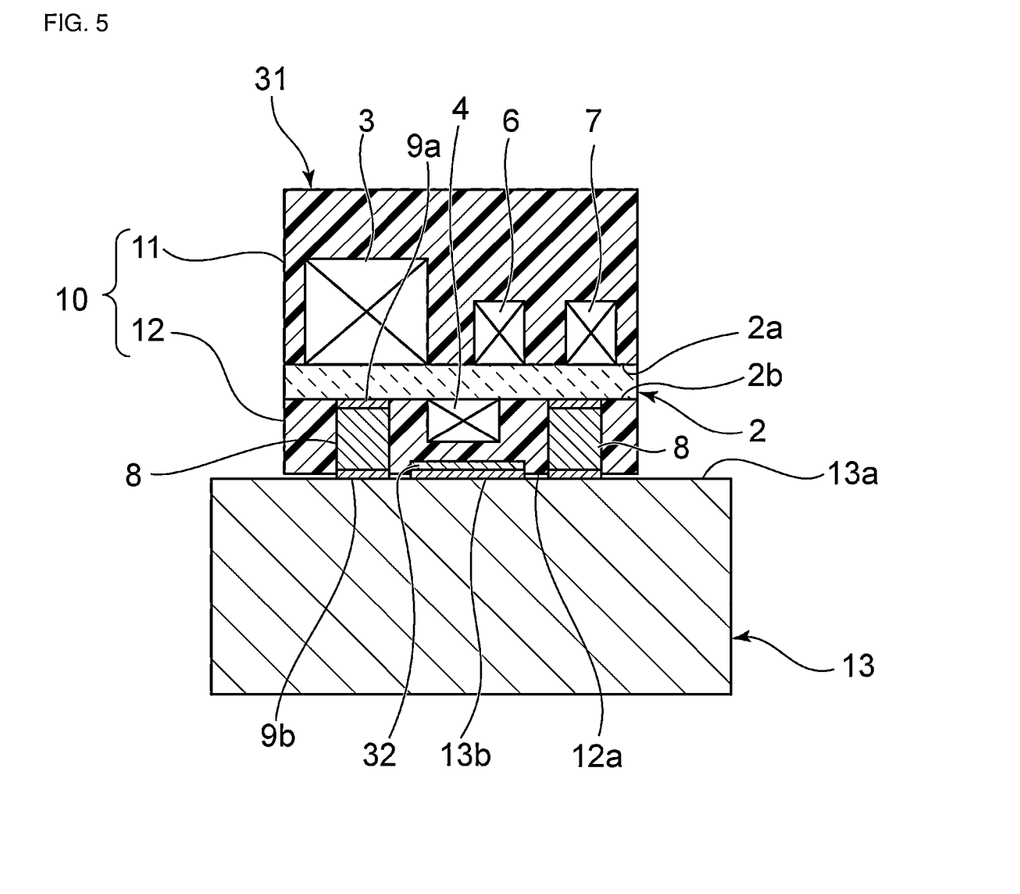
FIG. 5 is a front sectional view illustrating an acceleration detection device according to a third preferred embodiment of the present invention.

FIG. 5 is a front sectional view illustrating an acceleration detection device according to a third preferred embodiment of the present invention. An acceleration detection device 31 according to the third preferred embodiment of the present invention is the same or substantially the same as the acceleration detection device 1 according to the first preferred embodiment except that a metal layer 32 is provided. Accordingly, the same or corresponding components as in the acceleration detection device 1 are denoted by the same reference numerals, and description thereof is omitted.

In the acceleration detection device 31, the metal layer 32 is provided on the outer surface 12a. A metal film 13b is provided on the mount surface 13a of the detection object 13. The metal layer 32 is joined to a metal film 13b via a joint material, which is not illustrated. Therefore, in the acceleration detection device 31, the area of the joint portion between the acceleration detection device 31 and the mount surface 13a can be increased without the area of the outer surface 12a of the board 2 being increased. Accordingly, as in the acceleration detection device 21 according to the second preferred embodiment, the frequency of the structural resonance of the entire acceleration detection device 31 can be notably higher without the area of the board 2 being increased.

The metal layer 32 may be electrically connected to the acceleration detection element 3, the first circuit components 4 and 5, and the second circuit components 6 and 7. That is, the metal layer 32 may define and function as an electrode. In addition, for example, when the metal layer 32 is an electrically floating electrode, the metal layer 32 may define and function as an electromagnetic shield for the first circuit components 4 and 5 and the like.

However, instead of the metal layer 32, a joint layer made of another electrically conductive material or an insulating material may be provided. In this case, the metal film 13b on the mount surface 13a of the detection object 13 may also be made of another electrically conductive material or a material other than a conductive material. Even in such a case, the frequency of the structural resonance of the entire acceleration detection device 31 can be increased by increasing the area of the joint portion.

The acceleration detection element 3 includes an appropriate acceleration detection element that outputs an electrical signal corresponding to the magnitude of an applied acceleration. Accordingly, the structure of the acceleration detection element 3 is not particularly limited as long as this function is achieved, but an example will be described with reference to FIGS. 6 and 7.

Figure 6:
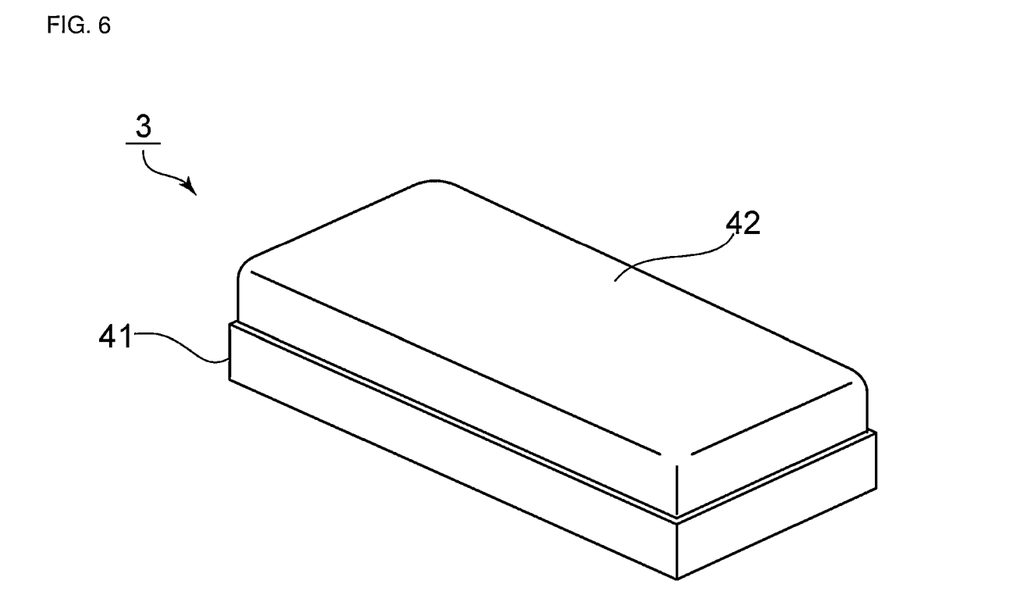
FIG. 6 is a perspective view illustrating an example of an acceleration detection element according to a preferred embodiment of the present invention.
Figure 7:
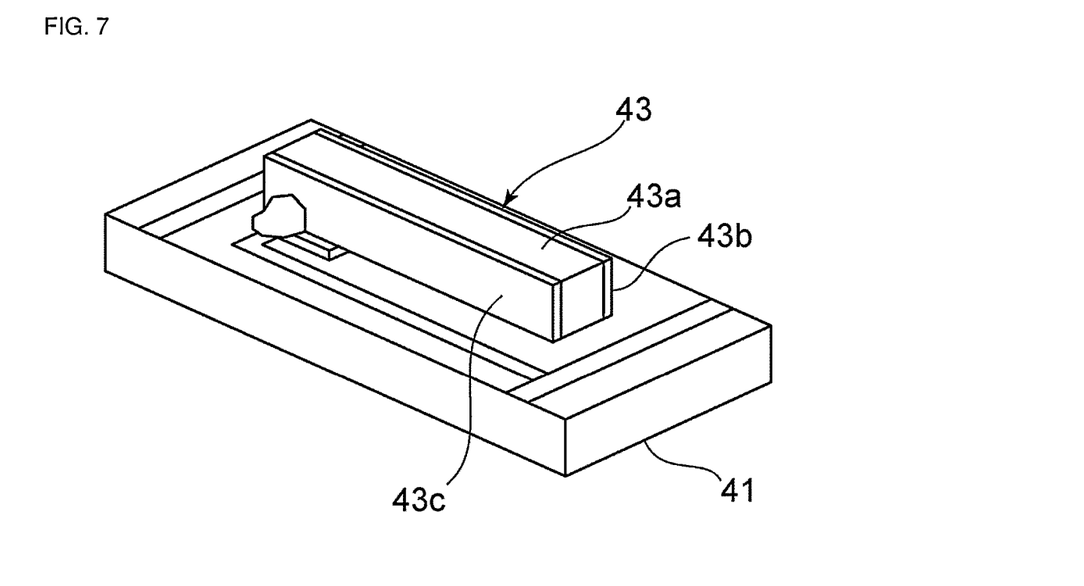
FIG. 7 is a perspective view for describing the internal structure of the example of the acceleration detection element according to a preferred embodiment of the present invention.

FIG. 6 is a perspective view illustrating an example of the acceleration detection element according to a preferred embodiment of the present invention. FIG. 7 is a perspective view for describing the internal structure of the example of the acceleration detection element shown in FIG. 6.

The acceleration detection element 3 includes an element board 41, a cap 42, and a piezoelectric element 43 to detect an acceleration. The piezoelectric element 43 is mounted on the element board 41. The piezoelectric element 43 includes a piezoelectric element 43a having a strip shape. Electrodes 43b and 43c are provided on both sides of the piezoelectric element 43a. The piezoelectric element 43 is attached to the element board 41 in a cantilevered manner. When an acceleration is applied to the piezoelectric element 43, the piezoelectric element 43 vibrates and an electric signal is output in response to the piezoelectric effect.

The cap 42 is fixed to the element board 41 and the piezoelectric element 43 is sealed.

Figure 8:
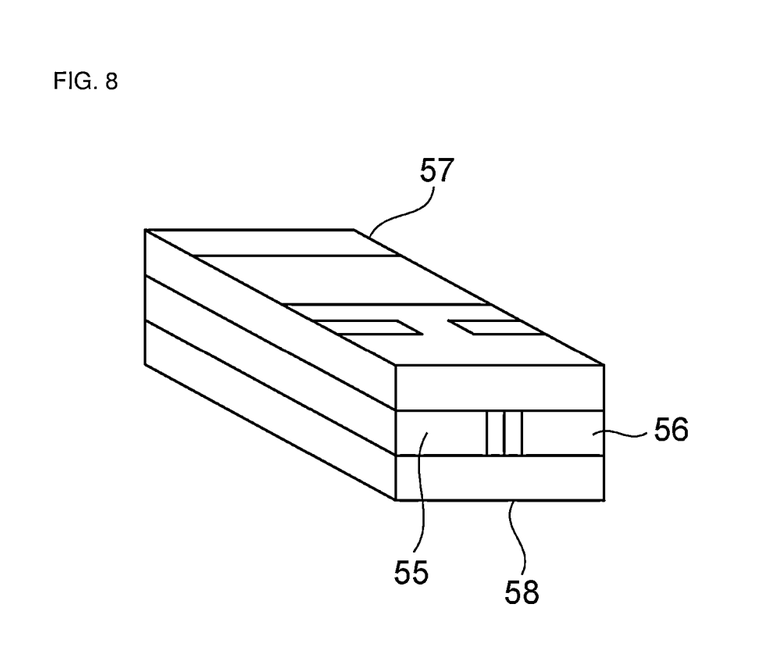
FIG. 8 is a perspective view illustrating another example of the acceleration detection element according to a preferred embodiment of the present invention.
Figure 9:
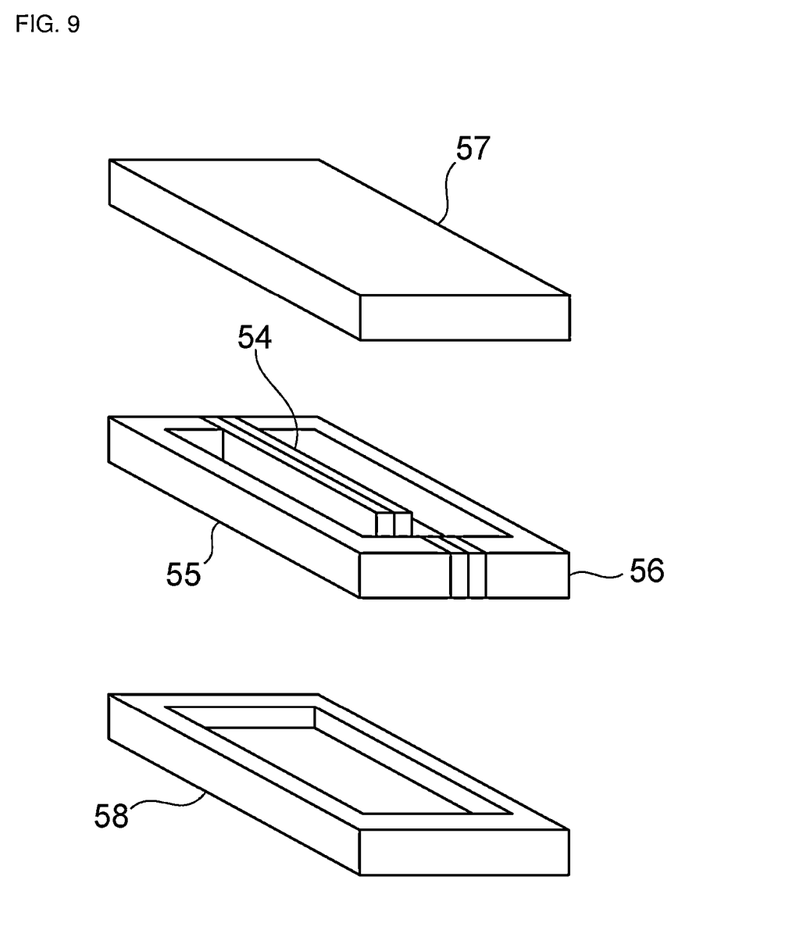
FIG. 9 is a perspective view for describing the internal structure of the other example of the acceleration detection element according to a preferred embodiment of the present invention.

Another example of an acceleration detection element according to a preferred embodiment of the present invention will be described with reference to FIGS. 8 and 9. FIG. 8 is a perspective view illustrating the other example of the acceleration detection element. FIG. 9 is a perspective view for describing the internal structure of the other example of the acceleration detection element.

The acceleration detection element includes a piezoelectric element 54, a first clamping member 55, a second clamping member 56, a first exterior board 57, and a second exterior board 58. The piezoelectric element 54 according to a preferred embodiment of the present invention is rectangular or substantially rectangular parallelepiped and includes a first piezoelectric layer, a second piezoelectric layer, and detection electrodes, which are not shown. The first piezoelectric layer and the second piezoelectric layer are made of, for example, a PZT ceramic. The detection electrodes are provided on the outer surface of the first piezoelectric layer and the outer surface of the second piezoelectric layer.

The first clamping member 55 and the second clamping member 56 are joined to the piezoelectric element 54. The piezoelectric element 54 is cantilevered and supported by the first clamping member 55 and the second clamping member 56. The first clamping member 55 and the second clamping member 56 have grooves that open to the piezoelectric element 54. The grooves define a space that does not interfere with the displacement of the piezoelectric element 54 in response to an acceleration.

The first exterior board 57 and the second exterior board 58 are made of, for example, an insulating material. The first exterior board 57 is a planar member. The second exterior board 58 includes a recess portion. However, both the first exterior board 57 and the second exterior board 58 may include recess portions. The recess portions define a space that does not interfere with the displacement of the piezoelectric element 54 in response to an acceleration. The piezoelectric element 54, the first clamping member 55, and the second clamping member 56 are disposed between the first exterior board 57 and the second exterior board 58.

In addition, the acceleration detection element may be an acceleration detection element that includes an electrical capacitance element instead of a piezoelectric element.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An acceleration detection device comprising:
   a board including a first surface and a second surface facing away from the first surface;
   an acceleration detector mounted on the first surface of the board;
   a first circuit component mounted on the second surface of the board;
   a seal including a first sealing portion covering the acceleration detector on the first surface of the board and a second sealing portion covering the first circuit component on the second surface of the board, the second sealing portion including an inner surface facing the board and an outer surface on a side opposite to the inner surface, the seal being made of a resin; and
   a high-rigidity body extending in a direction in which the outer surface and the second surface of the board are connected to each other within the second sealing portion; wherein
   the high-rigidity body has higher rigidity than the seal; and
   in the direction in which the outer surface and the second surface of the board are connected to each other, a maximum height of the second sealing portion is equal to, substantially equal to, or greater than a maximum height of the high-rigidity body.

2. The acceleration detection device according to claim 1, further comprising a second circuit component mounted on the first surface of the board.

3. The acceleration detection device according to claim 2, wherein the high-rigidity body is electrically conductive and electrically connected to one of the acceleration detector, the first circuit component, and the second circuit component.

4. The acceleration detection device according to claim 1, wherein a plurality of high-rigidity bodies are provided in a region in which the acceleration detector overlaps the board as seen in a direction in which the outer surface and the second surface of the board are connected to each other, the high-rigidity body being one of the plurality of high-rigidity bodies.

5. The acceleration detection device according to claim 1, wherein the high-rigidity body is joined to the second surface of the board via a joint material.

6. The acceleration detection device according to claim 5, wherein the joint material is a conductive joint material.

7. The acceleration detection device according to claim 1, wherein the high-rigidity body is made of metal.

8. The acceleration detection device according to claim 1, wherein the high-rigidity body is made of ceramic.

9. The acceleration detection device according to claim 1, wherein the high-rigidity body is a columnar body including a longitudinal direction.

10. The acceleration detection device according to claim 1, wherein the acceleration detector includes a piezoelectric element and outputs an acceleration as an electric signal.

11. The acceleration detection device according to claim 1, wherein the first and second sealing portions are made of a single resin.

12. The acceleration detection device according to claim 9, wherein the high-rigidity body is defined by a cylindrical or substantially cylindrical metal pin.

13. The acceleration detection device according to claim 5, wherein the joint material is solder.

14. The acceleration detection device according to claim 5, wherein the joint material is an electrically non-conductive joint material.

15. The acceleration detection device according to claim 1, wherein a metal layer is provided on the outer surface.

16. The acceleration detection device according to claim 15, wherein the metal layer is electrically connected to the acceleration detector.

17. The acceleration detection device according to claim 15, wherein the metal layer defines and functions as an electromagnetic shield.

18. The acceleration detection device according to claim 1, wherein
   the acceleration detector includes an element board, a cap, and a piezoelectric element; and
   the piezoelectric element is mounted on the element board in a cantilevered manner.

19. An acceleration detection device comprising:
- a board including a first surface and a second surface facing away from the first surface;
- an acceleration detector mounted on the first surface of the board;
- a first circuit component mounted on the second surface of the board;
- a seal including a first sealing portion covering the acceleration detector on the first surface of the board and a second sealing portion covering the first circuit component on the second surface of the board, the second sealing portion including an inner surface facing the board and an outer surface on a side opposite to the inner surface, the seal being made of a resin; and
- a high-rigidity body extending in a direction in which the outer surface and the second surface of the board are connected to each other within the second sealing portion; wherein
- the high-rigidity body has higher rigidity than the seal; and
- the high-rigidity body is embedded within the second sealing portion such that only an end of the high-rigidity body, in the direction in which the outer surface and the second surface of the board are connected to each other, is exposed from the second sealing portion.

20. An acceleration detection device comprising:
- a board including a first surface and a second surface facing away from the first surface;
- an acceleration detector mounted on the first surface of the board;
- a first circuit component mounted on the second surface of the board;
- a seal including a first sealing portion covering the acceleration detector on the first surface of the board and a second sealing portion covering the first circuit component on the second surface of the board, the second sealing portion including an inner surface facing the board and an outer surface on a side opposite to the inner surface, the seal being made of a resin; and
- a high-rigidity body extending in a direction in which the outer surface and the second surface of the board are connected to each other within the second sealing portion; wherein
- the high-rigidity body has higher rigidity than the seal; and
- a plurality of high-rigidity bodies are provided in a region in which the acceleration detector overlaps the board as seen in a direction in which the outer surface and the second surface of the board are connected to each other, the high-rigidity body being one of the plurality of high-rigidity bodies.

* * * * *